United States Patent
Oozeki et al.

(10) Patent No.: US 8,423,082 B2
(45) Date of Patent: Apr. 16, 2013

(54) IMAGING DEVICE, IMAGING METHOD AND PROGRAM

(75) Inventors: Keisuke Oozeki, Tokyo (JP); Yoshihiko Akamatsu, Osaka (JP); Naohito Yoshida, Osaka (JP)

(73) Assignee: NEC Corporation, Tokyo (JP)

( * ) Notice: Subject to any disclaimer, the term of this patent is extended or adjusted under 35 U.S.C. 154(b) by 91 days.

(21) Appl. No.: 13/148,195

(22) PCT Filed: Jan. 29, 2010

(86) PCT No.: PCT/JP2010/051215
§ 371 (c)(1),
(2), (4) Date: Aug. 5, 2011

(87) PCT Pub. No.: WO2010/090134
PCT Pub. Date: Aug. 12, 2010

(65) Prior Publication Data
US 2011/0294546 A1    Dec. 1, 2011

(30) Foreign Application Priority Data
Feb. 6, 2009    (JP) .................................. 2009-026188

(51) Int. Cl.
*H04W 88/02*    (2009.01)
(52) U.S. Cl.
USPC ...................................................... 455/556.1

(58) Field of Classification Search .................. 348/135, 348/218.1, 222.1, 340, 344, 362; 455/414.1, 455/556.1; 359/557, 696, 813
See application file for complete search history.

(56) References Cited

U.S. PATENT DOCUMENTS

| | | | |
|---|---|---|---|
| 6,195,511 B1 * | 2/2001 | Harada | 396/300 |
| 2005/0026575 A1 | 2/2005 | Nagatomo | |
| 2008/0220833 A1 * | 9/2008 | Lee et al. | 455/575.3 |
| 2010/0199078 A1 * | 8/2010 | Shih et al. | 713/2 |
| 2011/0009111 A1 * | 1/2011 | Jung et al. | 455/419 |
| 2011/0039599 A1 * | 2/2011 | Shiraki et al. | 455/556.1 |

FOREIGN PATENT DOCUMENTS

| | | |
|---|---|---|
| JP | 2000-47282 A | 2/2000 |
| JP | 2000-236476 A | 8/2000 |
| JP | 2005-065235 A | 3/2005 |
| JP | 2006-019803 A | 1/2006 |
| JP | 2006-174252 A | 6/2006 |
| JP | 2006-325008 A | 11/2006 |
| JP | 2009-182601 A | 8/2009 |

OTHER PUBLICATIONS

Communication dated May 30, 2012 issued by the European Patent Office in corresponding European Application No. 10 73 8468.

* cited by examiner

*Primary Examiner* — Diane Mizrahi
(74) *Attorney, Agent, or Firm* — Sughrue Mion, PLLC

(57) ABSTRACT

An imaging device comprising: a camera; and a control unit that encodes an image photographed by the camera to form an encoded image, wherein re-booting of the camera and the encoding by the control unit are carried out in parallel to each other.

13 Claims, 4 Drawing Sheets

IMAGING DEVICE, IMAGING METHOD AND PROGRAM

CROSS REFERENCE TO RELATED APPLICATIONS

This application is a National Stage of International Application No. PCT/JP2010/051215 filed Jan. 29, 2010, claiming priority based on Japanese Patent Application No. 2009-026188, filed Feb. 6, 2009, the contents of all of which are incorporated herein by reference in their entirety.

TECHNICAL FIELD

Reference to Related Application

This application is based upon and claims the benefit of the priority of Japanese patent application No. 2009-026188 filed on Feb. 6, 2009, the disclosure of which is incorporated herein in its entirety by reference thereto.
This invention relates to an imaging device, an imaging method and a program. More particularly, this invention relates to an imaging device, an imaging method and a program for use on a mobile terminal, such as mobile phone.

BACKGROUND

A conventional imaging device provided on a mobile terminal, such as mobile phone, will be explained with reference to the drawings. FIG. 3 depicts a block diagram showing a configuration of a conventional imaging device. Referring to FIG. 3, an imaging device 110 includes a control unit 111, a camera 112, a display 113, a sound producing unit 114 and a light emitting unit 115.

FIG. 4 depicts a flowchart showing an operation of the imaging device 110 provided on a mobile terminal. Referring to FIG. 4, after the start of photographing by the imaging device 110, provided on the mobile terminal, the sound producing unit 114 produces a shutter sound. The display 113 performs demonstration and the light emitting unit 115 emits light (step S31) in order to indicate for a user that an object is being imaged. The control unit 111 then requests the camera 112 to acquire a photographed picture image (step S32), and performs polling until the end of acquisition of the picture image (step S33).

The control unit 111 then encodes the acquired picture image (step S34) and effects polling until the end of the encoding (step S35). The control unit 111 causes the encoded picture image to be demonstrated as photographed image on the display 113 (step S36). Then, to initialize the camera 112, the control unit 111 causes the camera 112 to be re-booted (step S37). After the end of the re-booting (Yes of step S38), the imaging device 110 is ready to photograph the next picture image.

Patent Document 1 shows an imaging device in which, from data including picture images stored in a buffer, data including different picture images are simultaneously recorded in a plurality of non-volatile memories. In this manner, recording on the non-volatile memories may be made at a speed faster than when the data are recorded on an apparently single non-volatile memory, thereby shortening the queuing time for next photographing.
[Patent Document 1]:
JP Patent Kokai Publication No. JP-P2006-174252A

SUMMARY

The entire disclosure of the above mentioned Patent Document are incorporated herein by reference thereto. The following analysis is by the present inventor. In the photographing processing by the camera 112 of the imaging device 110, a sequence of operations, inclusive of acquisition of a photographed picture image, production of the shutter sound, light emission by the light emitting unit, encoding of the photographed picture image and re-booting of the camera 112, is carried out in order, viz., sequentially. Hence, it takes some time since the start of photographing until the next photographing is enabled. It is thus difficult to perform consecutive photographing by the camera of the mobile phone provided with the imaging device 110.

Therefore, there is a need in the art to provide an imaging device to shorten the time since the start of photographing until the next photographing in a mobile phone provided with a camera.

According to a first aspect of the present invention, there is provided an imaging device, comprising:
a camera; and
a control unit that encodes an image photographed by the camera to form an encoded image, wherein
re-booting of the camera and the encoding by the control unit are carried out in parallel to each other.

According to a second aspect of the present invention, there is provided an imaging method, comprising:
encoding an image photographed by a camera of a mobile terminal; and
re-booting the camera, wherein
the encoding and the re-booting are carried out in parallel to each other.

According to a third aspect of the present invention, there is provided a program causing a computer provided on a mobile terminal to execute:
encoding an image photographed by a camera of the mobile terminal; and
re-booting the camera, wherein
the encoding and the rebooting are carried out in parallel to each other.
The program may be recorded on a non-transient computer-readable recording medium to provide a program product.

The present invention provides the following advantage, but not restricted thereto. With the imaging device, imaging method and the program, according to the present invention, the time duration since the start of photographing by a camera until the time the next photographing is enabled may be shortened in a mobile terminal carrying the camera thereon.

PREFERRED MODES

Figure 1:
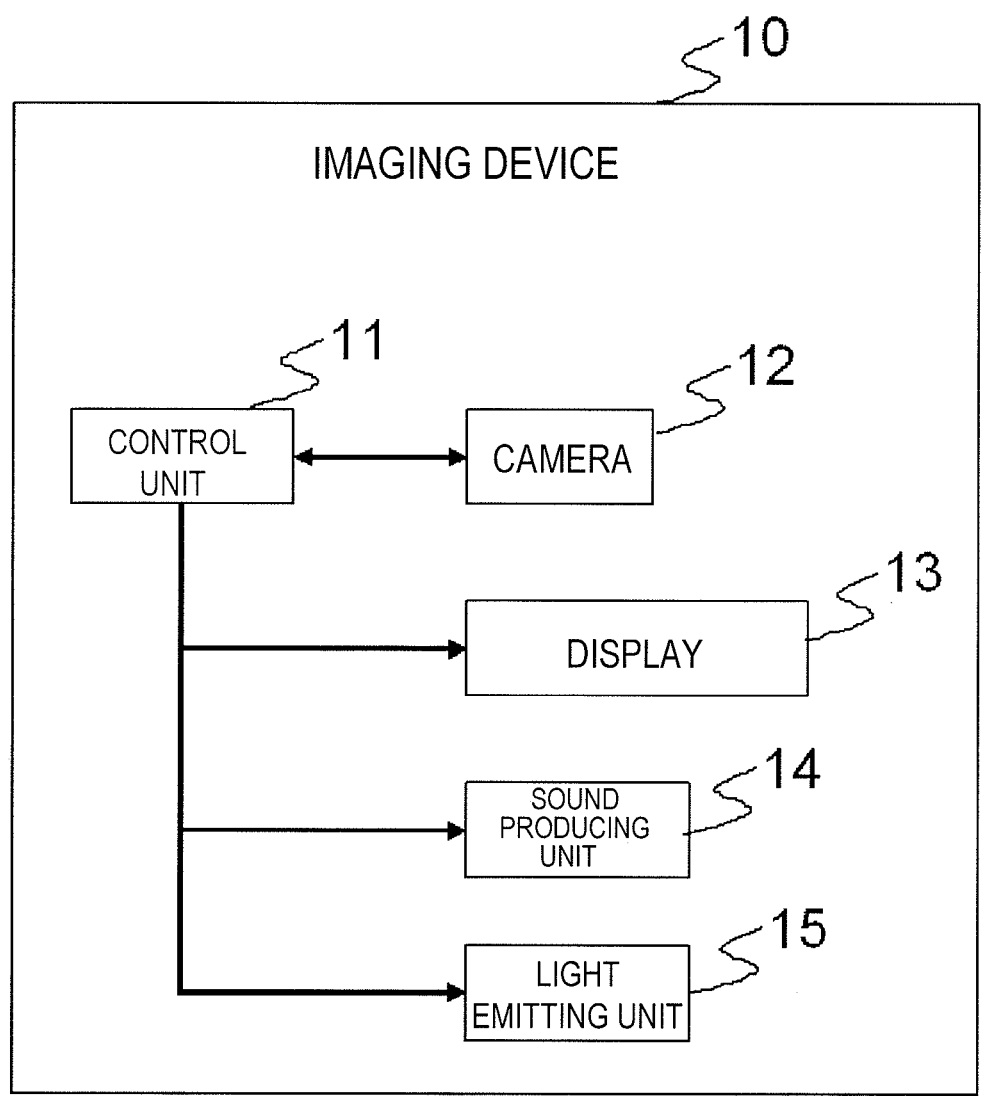
FIG. 1 is a block diagram showing a configuration of an imaging device according to an exemplary embodiment.

In the present disclosure, there are various possible modes, which includes the following, but not restricted thereto. An imaging device according to an exemplary embodiment will now be described with reference to the drawings. FIG. 1 depicts a block diagram showing a configuration of an imaging device according to an exemplary embodiment.

Referring to FIG. 1, an imaging device 10 comprises a camera 12 and a control unit 11. The control unit 11 encodes a picture image, photographed by the camera 12, to form an encoded picture image. The re-booting of the camera 12 and the encoding of the picture image by the control unit 11 are configured to take place in the imaging device 10 as parallel operations to each other, thereby shortening the time since photographing by the camera 12 until next photographing.

It is also possible for the control unit 11 to compress the encoded picture image. By so doing, the capacity of the picture image may be reduced.

Preferably, the imaging device 10 may also comprise a display 13 which demonstrates the encoded picture image. By so doing, the imaging device 10 may be improved in usefulness to users.

It is likewise possible for the display 13 to demonstrate the state of processing in the camera 12 and in the control unit 11. By so doing, the imaging device 10 may further be improved in usefulness to users.

Also preferably, the imaging device 10 may comprise a sound producing unit 14. The sound producing unit 14 emits sound at the time of photographing by the camera 12. It is also possible for the sound producing unit 14 to produce a shutter sound. The sound producing unit 14 informs a person(s) around the imaging device 10 of the fact that the camera 12 is being used, thereby preventing possible photo spying.

The imaging device 10 may further comprise a light emitting unit 15. The light emitting unit 15 produces light during image forming by the camera 12. The light emitting unit 15 may be provided with an LED. The person(s) around the imaging device 10 may be informed by the emitted light of the fact that the camera 12 is being used, thus preventing photo spying.

Preferably, the mobile terminal comprises the above mentioned imaging device 10. Also preferably, the mobile terminal includes the function of telephony. It is then possible to shorten the time interval between consecutive photographing events by the camera provided on the mobile terminal, such as mobile phone.

FIRST EXAMPLE (Configuration)

An imaging device according to an Example of will be described with reference to the drawings, including FIG. 1. FIG. 1 depicts a block diagram showing a configuration of the imaging device of the present Example. Referring to FIG. 1, the imaging device 10 comprises a control unit 11, a camera 12, a display 13, a sound producing unit 14 and a light emitting unit 15.

The control unit 11 controls the camera 12, sound producing unit 14, light emitting unit 15 and the display 13. The control unit 11 also processes the picture image, acquired from the camera 12, as display data for the display 13, while doing encoding to convert the picture image into data for storage, such as JPEG data.

The camera 12 acquires an ambient image to transmit picture image data to the control unit 11.

The display 13 demonstrates the status of the mobile phone to a user, while also indicating for the user, as MMI (Man-Machine Interface), that photographing or encoding is going on. The display 13 also demonstrates corresponding images in order for the user to confirm the picture image being photographed or already photographed.

The sound producing unit 14 produces a shutter sound. In particular, the sound producing unit 14 produces the shutter sound during photographing.

The light emitting unit 15 generates light to inform those around the imaging device that photographing is going on and also to prevent photo spying. The light emitting unit 15 may, for example, be an LED.

(Operation)

Figure 2:
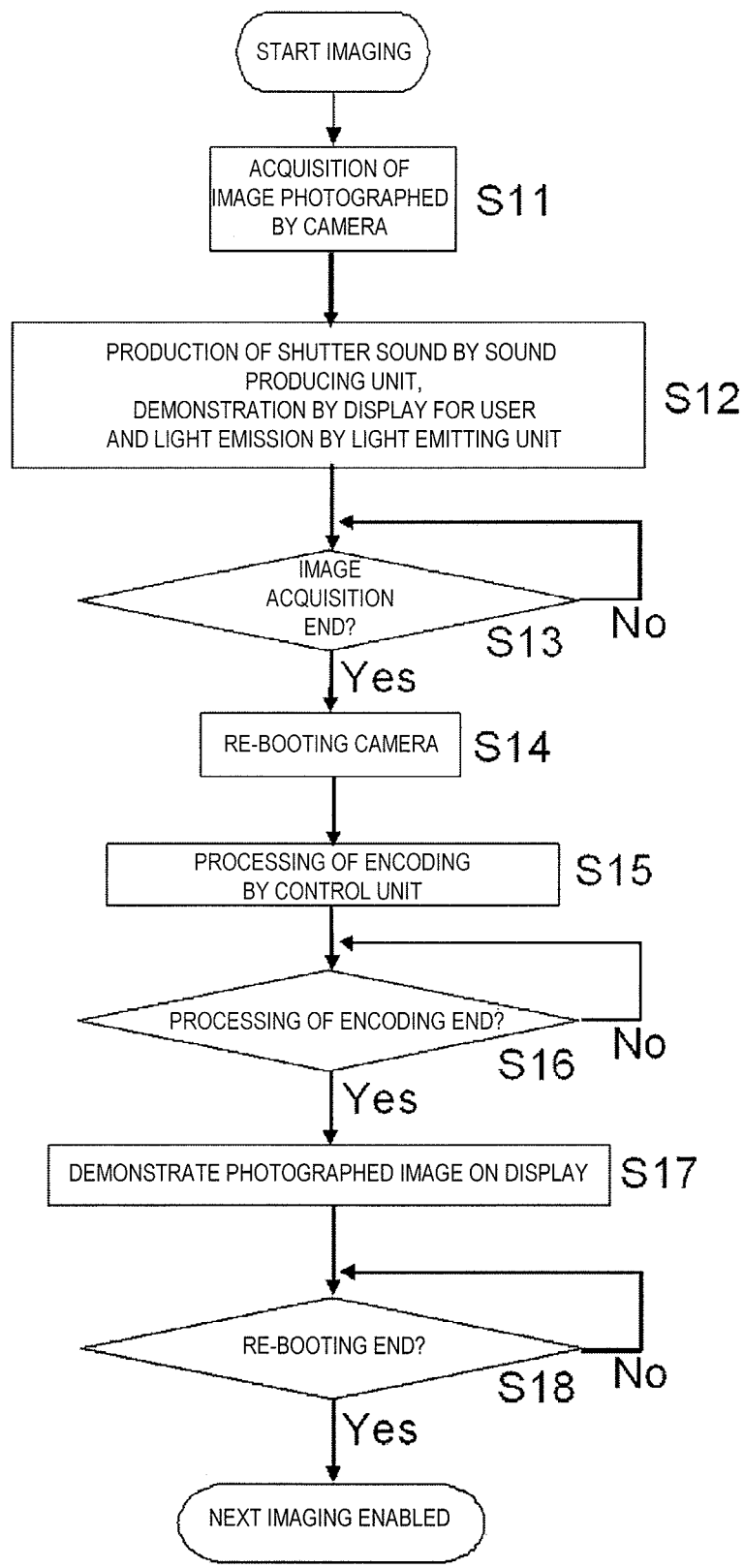
FIG. 2 is a flowchart for illustrating an operation of the imaging device according to the exemplary embodiment.
Figure 3:
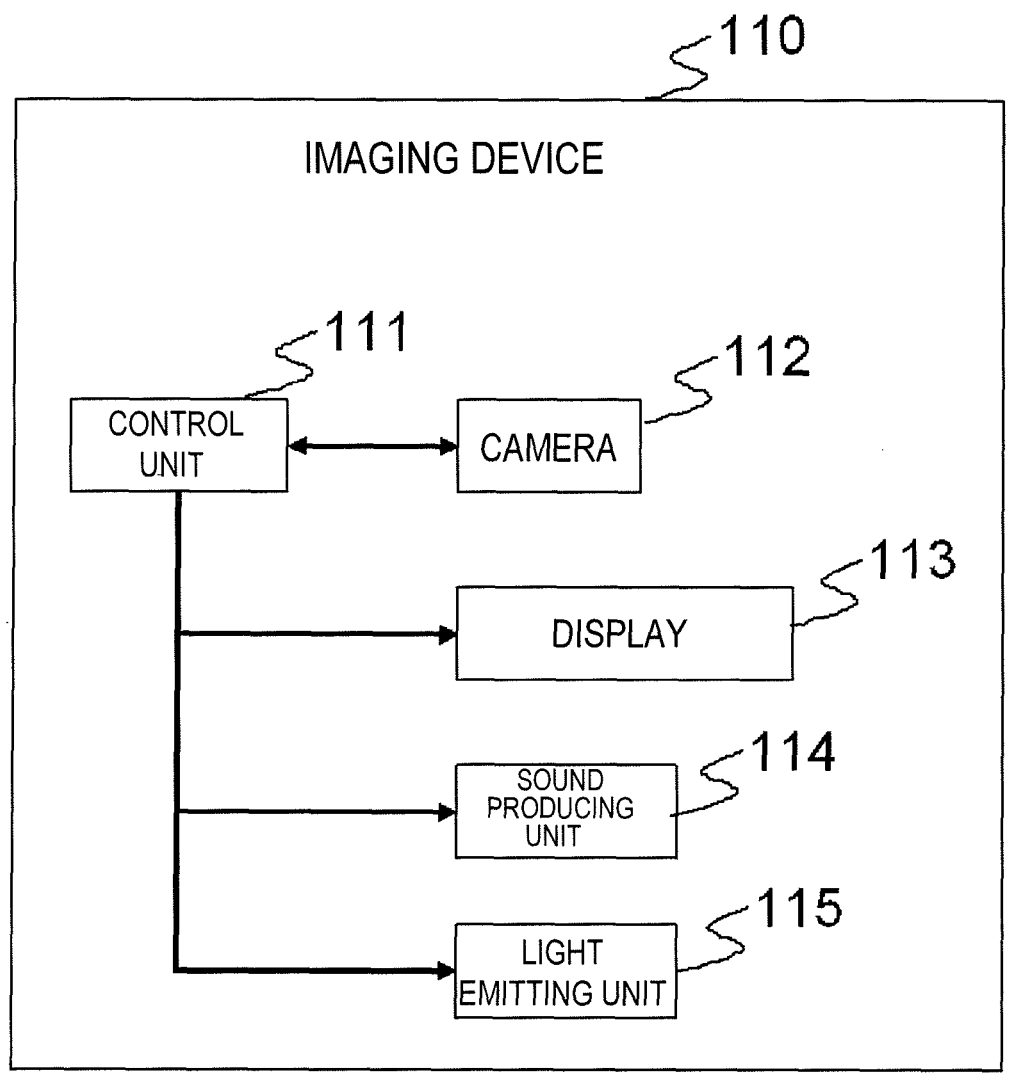
FIG. 3 is a block diagram showing a configuration of a conventional imaging device.
Figure 4:
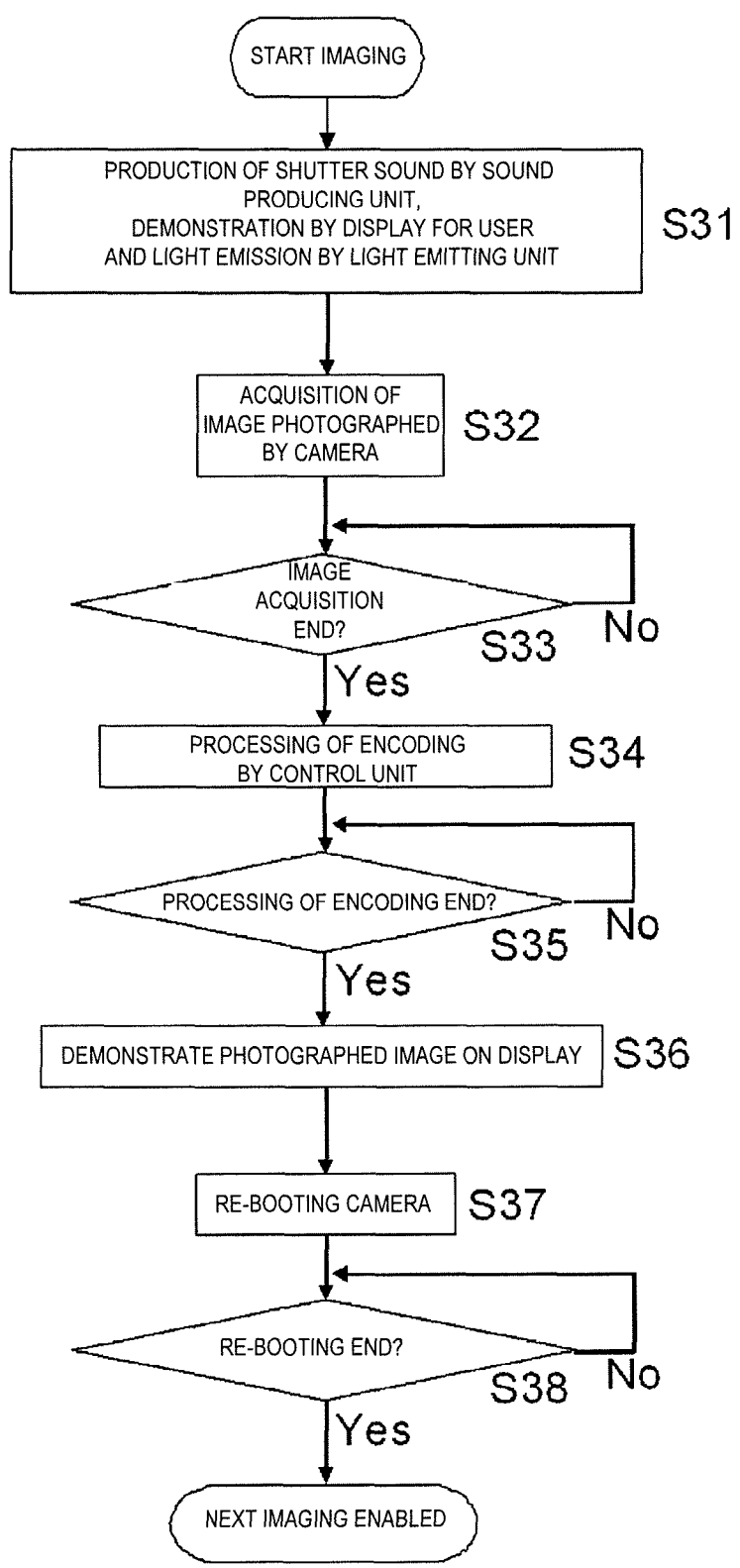
FIG. 4 is a flowchart for illustrating an operation of the conventional imaging device.

An operation of the imaging device 10 of the present Example will now be described with reference to the drawings. FIG. 2 depicts a flowchart for illustrating the operation of the imaging device 10 of the present Example.

The imaging device 10 of the present Example requests the camera 12 to acquire a photographed image (step S11). Before polling of the end of acquisition of the photographed image, the sound producing unit 14 emits a shutter sound, while the display 13 demonstrates data for photographing for the user engaged in photographing, and the light emitting unit 15 emits light (step S12). The polling of the end of acquisition of the photographed image is then performed (step S13).

After the end of the picture image acquisition, re-booting of the camera 12 is initiated (step S14). Before initiating the polling of the end of the re-booting, the control unit 11 performs encoding (steps S15, S16), while the display 13 demonstrates the photographed image (step S17). Then, polling of the end of the re-booting of the camera 12 is then carried out (step S18). After the end of the re-booting (Yes of the step S18), the imaging device 10 is ready to photograph the next image.

(Meritorious Effect)

In this manner, the production of the shutter sound, demonstration on the display of the photographing process going on, and lighting of the light emitting unit 15 are carried out during the time as from the request for acquisition of the photographed image until the processing for the end of the acquisition. Once the image acquisition has come to a close, camera re-booting is initiated. Until the time of the processing for re-booting, the photographed image is encoded and demonstrated on the display. In this manner, the sequential processing operations may be carried out in parallel to shorten the time until next photographing is enabled.

SECOND EXAMPLE

A Second Example will now be described. In the present Example, the order of initiation of the processing operations, carried out in parallel in the above mentioned First Example, is changed.

For example, it may occur that the time for the control unit 11 to perform the encoding is longer than the time the elapses until the camera 12 is re-booted. In such case, after the image acquisition from the camera 12, the encoding of the picture image by the control unit 11 (step S15 of FIG. 2) may be initiated at first. The re-booting of the camera 12 (step S14 of FIG. 2) may subsequently be initiated.

In the framework of entire disclosure of the present invention (including the claims), and based on its basic technological idea, exemplary embodiments or examples of the present invention may be changed and/or adjusted. Also it should be noted that in the framework of the claims of the present invention, any combinations or selections of various elements disclosed herein are possible. That is, needless to say, it is understood by those skilled in the art that various changes or modifications can be made to the present invention based on the disclosure of the present invention including the claims and the technological idea of the present invention.

The present invention also comprises the following Modes of Examples of Execution:

(Mode 1)
An imaging device according to the above mentioned first aspect.
(Mode 2)
In the imaging device, the control unit may compress the encoded image.
(Mode 3)
In the imaging device, the re-booting of the camera and the processing of compression by the control unit may be carried out in parallel to each other.
(Mode 4)
The imaging device may further comprise a display that demonstrates the encoded image.
(Mode 5)
In the imaging device, the display may demonstrate a state of processing by the camera and the control unit.
(Mode 6)
The imaging device may further comprise a sound producing unit that produces a sound when the camera takes a photograph.
(Mode 7)
In the imaging device, the sound producing unit may produce a shutter sound.
(Mode 8)
The imaging device may further comprise a light emitting unit that emits light when the camera takes a photograph.
(Mode 9)
In the imaging device, the light emitting unit may comprise an LED.
(Mode 10)
A mobile terminal may comprise the imaging device.
(Mode 11)
The mobile terminal may further comprise a call function.
(Mode 12)
An imaging method according to the above mentioned second aspect.
(Mode 13)
A program according to the above mentioned third aspect.
(Mode 14)
A computer-readable recording medium having recorded thereon the program.

The invention claimed is:

1. An imaging device, comprising:
   a camera; and
   a control unit that encodes an image photographed by the camera to form an encoded image, wherein
   re-booting of the camera and the encoding by the control unit are carried out in parallel to each other.

2. The imaging device according to claim 1, wherein
   the control unit compresses the encoded image.

3. The imaging device according to claim 2, wherein
   the re-booting of the camera and the processing of compression by the control unit are carried out in parallel to each other.

4. The imaging device according to of claim 1, further comprising:
   a display that demonstrates the encoded image.

5. The imaging device according to claim 4, wherein
   the display demonstrates a state of processing by the camera and the control unit.

6. The imaging device according to claim 1, further comprising:
   a sound producing unit that produces a sound when the camera takes a photograph.

7. The imaging device according to claim 6, wherein
   the sound producing unit produces a shutter sound.

8. The imaging device according to claim 1, further comprising:
   a light emitting unit that emits light when the camera takes a photograph.

9. The imaging device according to claim 8, wherein
   the light emitting unit comprises an LED.

10. A mobile terminal comprising the imaging device according to claim 1.

11. The mobile terminal according to claim 10, further comprising:
    a call function.

12. An imaging method, comprising:
    encoding an image photographed by a camera of a mobile terminal; and
    re-booting the camera, wherein
    the encoding and the re-booting are carried out in parallel to each other.

13. A program, causing a computer provided on a mobile terminal to execute:
    encoding an image photographed by a camera of the mobile terminal; and
    re-booting the camera, wherein
    the encoding and the rebooting are carried out in parallel to each other.

* * * * *